US011364575B2

(12) United States Patent
Sekine

(10) Patent No.: US 11,364,575 B2
(45) Date of Patent: Jun. 21, 2022

(54) METAL PARTICLE

(71) Applicant: NAPRA CO., LTD., Tokyo (JP)

(72) Inventor: Shigenobu Sekine, Tokyo (JP)

(73) Assignee: Napra Co., Ltd., Tokyo (JP)

(*) Notice: Subject to any disclaimer, the term of this patent is extended or adjusted under 35 U.S.C. 154(b) by 0 days.

(21) Appl. No.: 17/151,958

(22) Filed: Jan. 19, 2021

(65) Prior Publication Data
US 2021/0283725 A1 Sep. 16, 2021

(30) Foreign Application Priority Data

Mar. 12, 2020 (JP) .............................. JP2020-042772

(51) Int. Cl.
*B23K 35/26* (2006.01)
*C22C 13/00* (2006.01)
*B22F 1/05* (2022.01)
*B22F 9/08* (2006.01)

(52) U.S. Cl.
CPC .............. *B23K 35/262* (2013.01); *B22F 1/05* (2022.01); *B22F 9/08* (2013.01); *C22C 13/00* (2013.01); *B22F 2301/30* (2013.01); *B22F 2304/10* (2013.01)

(58) Field of Classification Search
None
See application file for complete search history.

(56) References Cited

U.S. PATENT DOCUMENTS 10,016,848 B2   7/2018  Sekine

FOREIGN PATENT DOCUMENTS

| JP | 2001-287082 A |   | 10/2001 |
|----|---------------|---|---------|
| JP | 2003-311469   | * | 11/2003 |
| JP | 2007-268569 A |   | 10/2007 |
| JP | 6029222 B1    |   | 11/2016 |
| JP | 6174830 B1    |   | 8/2017  |
| JP | 6374072       | * | 8/2018  |
| JP | 2019-155465   | * | 9/2019  |

* cited by examiner

*Primary Examiner* — Xiaobei Wang
(74) *Attorney, Agent, or Firm* — Carrier Blackman & Associates, P.C.; Joseph P. Carrier; William D. Blackman

(57) ABSTRACT

A metal particle for joint material includes an intermetallic compound crystal that contains Sn, Cu, Ni and Ge, in a basal phase that contains Sn and an Sn—Cu alloy, the metal particle having a chemical composition represented by 0.7 to 15% by mass of Cu, 0.1 to 5% by mass of Ni, 0.001 to 0.1% by mass of Ge and the balance of Sn, the basal phase having a chemical composition represented by 95 to 99.9% by mass of Sn, 5% by mass or less of Cu and 0.1% by mass or less of an inevitable impurity, the intermetallic compound crystal residing in the basal phase so as to be included therein, the metal particle having a particle size of 1 μm to 50 μm, the metal particle containing an orthorhombic crystal structure, and at least parts of the basal phase and the intermetallic compound crystal forming an endotaxial joint.

7 Claims, 7 Drawing Sheets

(unit: % by mass)

| Numbering in FIG. 8 | Ni concentration (%) | Cu concentration (%) | Sn concentration (%) | Ge concentration (%) |
|---|---|---|---|---|
| 1 (IMC) | 6.04 | 31.48 | 62.479 | 0.001 |
| 2 (IMC) | 3.18 | 30.87 | 65.949 | 0.001 |
| 3 (IMC) | 2.73 | 19.82 | 77.439 | 0.001 |
| 4 (IMC) | 3.97 | 32.05 | 63.969 | 0.001 |
| 5 (IMC) | 3.45 | 29.82 | 66.729 | 0.001 |
| 6 (IMC) | 4.77 | 33.01 | 62.219 | 0.001 |
| 7 (basal phase) | 0 | 3.23 | 96.769 | 0.001 |
| 8 (whole metal particle) | 0.99 | 10.24 | 88.759 | 0.001 |

FIG. 9

METAL PARTICLE

INCORPORATION BY REFERENCE

This application is based on Japanese Patent Application No. 2020-42772, filed on Mar. 12, 2020, the content of which is incorporated hereinto by reference.

BACKGROUND OF THE INVENTION

1. Field of the Invention

This invention relates to a metal particle.

2. Description of the Related Art

In an advancing situation of IoT (Internet of Things) with ever-growing needs for energy saving, power semiconductor that holds the key for the technology has been increasingly gaining its importance, while leaving many problems on effective use thereof to be solved. The power semiconductor, which handles high power ascribed to high voltage and large current and is used for ultra-high speed transmission, produces large amount of heat and becomes hot. Si power semiconductor, although having been suited to a required level of heat resistance of approximately 175° C. at present, are on the way to development towards a Si power semiconductor durable to higher temperatures, approximately at 200° C. Next-generation power semiconductors with use of SiC and GaN, for example, are required to retain transmission characteristic by using gold on the top and back surfaces of devices, and are also required to be durable to extremely high temperatures from 250 to 500° C.

Referring now to the joint material, there has been no joint material which can attain a high level of heat resistance required for the next-generation power semiconductor with use of SiC or GaN.

For example, an SnAgCu-based joint material (powdery solder material) disclosed in JP-A-2007-268569 is no more than a material applicable to the power semiconductor of a class of approximately 125° C., and is not applicable to the next-generation power semiconductor.

On the other hand, the present applicant has proposed in Japanese Patent No. 6029222 a metal particle that includes a shell and a core, wherein the core contains a metal or an alloy, the shell contains a mesh structure of an intermetallic compound and covers the core, meanwhile the core contains Sn or Sn alloy, and the shell contains an intermetallic compound of Sn and Cu. The joint area formed of this metal particle has been proven to retain high levels of heat resistance, joint strength and mechanical strength over a long period, even after prolonged operation at high temperatures, or after used in a harsh environment typically involving large temperature change from high temperature operational state down to low temperature idle state.

The intermetallic compound however suffers from brittleness, so that solving of this problem will open a way to provide a joint material that further excels in heat resistance, joint strength and mechanical strength.

CITATION LIST

[Patent Document 1] JP-A-2007-268569
[Patent Document 2] Japanese Patent No. 6029222

SUMMARY OF THE INVENTION

It is therefore an object of this invention to provide a metal particle that can suppress excessive Sn diffusion at the interface of joint area of any type even under harsh temperature change ranged from extra-high temperatures to extra-low temperatures, can overcome brittleness of the intermetallic compound, and can retain excellent joint strength and mechanical strength.

The present inventor went through extensive investigations, and found that aforementioned problem can be solved by a metal particle that contains a specific intermetallic compound in a specific basal phase. The finding led the present inventor to arrive at this invention.

This invention is to provide such metal particle for joint material, having an intermetallic compound crystal that contains Sn, Cu, Ni and Ge, in a basal phase that contains Sn and an Sn—Cu alloy, the metal particle having a chemical composition represented by 0.7 to 15% by mass of Cu, 0.1 to 5% by mass of Ni, 0.001 to 0.1% by mass of Ge and the balance of Sn, the basal phase having a chemical composition represented by 95 to 99.9% by mass of Sn, 5% by mass or less of Cu and 0.1% by mass or less of an inevitable impurity, the intermetallic compound crystal residing in the basal phase so as to be included therein, the metal particle having a particle size of 1 μm to 50 μm, the metal particle containing an orthorhombic crystal structure, and at least parts of the basal phase and the intermetallic compound crystal forming an endotaxial joint.

This invention also provides the metal particle for joint material, wherein the intermetallic compound crystal has a chemical composition represented by 99 to 60% by mass of Sn, 0.1 to 35% by mass of Cu, 6.5 to 0.1% by mass of Ni and 0.001 to 0.1% by mass of Ge.

Advantageous Effects of Invention

This invention can provide a metal particle that can suppress excessive Sn diffusion at the interface of joint area in a composite structure crystal that overcomes brittleness of the intermetallic compound, even under harsh temperature change ranged from extra-high temperatures to extra-low temperatures, and can thereby retain excellent joint strength and mechanical strength.

BRIEF DESCRIPTION OF THE DRAWINGS

FIG. 9 is a chart summarizing results of the analysis by AES.

DESCRIPTION OF THE EMBODIMENTS

This invention will further be detailed below.

Terminology in this patent specification will be defined as follows, unless otherwise specifically noted.

(1) The term "metal" is used not only to encompass metal element as a simple substance, but also occasionally to encompass alloy and intermetallic compound composed of two or more metal elements.

(2) When referring to a certain metal element as a simple substance, it means not only an absolutely pure substance solely composed of such metal element, but also a substance containing a trace amount of other substance. That is, the metal element of course does not mean to exclude a case where a trace impurity that hardly affects properties of that metal element is contained. As for the basal phase for example, it does not mean to exclude a case where a part of atoms in Sn crystal is replaced by other element (Cu, for example). For example, such other substance or other element may account for 0 to 0.1% by mass of the metal particle.

(3) Endotaxial joint means that an intermetallic compound precipitates in a substance which is expected to become metal or alloy (in this invention, the basal phase that contains Sn and an Sn—Cu alloy), wherein the Sn—Cu alloy and the intermetallic compound join during the precipitation while attaining lattice matching, to thereby produce crystal grains. The term "endotaxial" is a known term, which is found for example in the last paragraph on the left column on page 160, in Nature Chemistry, 3(2): 160-6, 2011.

The metal particle of this invention is featured by that it has an intermetallic compound crystal that contains Sn, Cu, Ni and Ge, in a basal phase that contains Sn and an Sn—Cu alloy.

Figure 1:
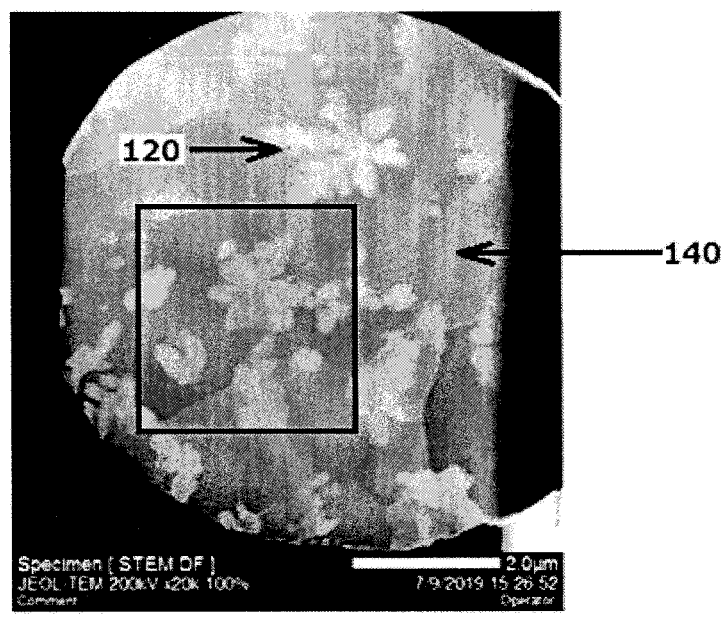
FIG. 1 is a STEM image of a cross section of a metal particle of this invention thinned with focused ion beam (FIB).

FIG. 1 is a STEM image of a cross section of the metal particle of this invention thinned with focused ion beam (FIB). Particle size of the metal particle of this invention, which is approximately 5 µm in FIG. 1, is preferably within the range from 1 µm to 50 µm for example. Referring now to the metal particle in FIG. 1, observed are a basal phase 140 that contains Sn and an Sn—Cu alloy, and resides therein an intermetallic compound 120 that is composed of Sn, Cu, Ni and Ge.

The metal particle of this invention typically contains 0.7 to 15% by mass of Cu, 0.1 to 5% by mass of Ni, 0.001 to 0.1% by mass of Ge, and the balance of Sn; and preferably contains 4 to 15% by mass of Cu, 0.1 to 1% by mass of Ni, 0.001 to 0.01% by mass of Ge, and the balance of Sn.

The metal particle of this invention may be manufactured typically from a starting material having a chemical composition represented by 8% by mass of Cu, 1% by mass of Ni, 0.001% by mass of Ge and the balance of Sn. For example, the metal particle is obtainable by melting the starting material, feeding the molten material onto a dish-like disk which is kept spinning at high speed in a nitrogen atmosphere, so as to centrifugally scatter the molten metal in the form of fine droplets, and by cooling and solidifying the droplets under reduced pressure.

A preferred example of a manufacturing apparatus suitable for manufacture of the metal particle of this invention will be explained referring to FIG. 2. A granulation chamber 1 has a cylindrical top and a conical bottom, and has a lid 2 placed on the top. The lid 2 has a nozzle 3 perpendicularly inserted at the center thereof, and right under the nozzle 3 arranged is a dish-like rotating disk 4. Reference sign 5 represents a mechanism that supports the dish-like rotating disk 4 so as to be movable up and down. At the lower end of the conical bottom of the granulation chamber 1, connected is a discharge pipe 6 through which the produced particles are output. An upper end of the nozzle 3 is connected to an electric furnace (high frequency induction furnace: employed in this invention is a carbon crucible for adding Ge, although a ceramic crucible has been used) 7 in which a metal to be granulated is melted. An atmospheric gas, having the chemical composition specifically adjusted in a mixed gas tank 8, is fed through a pipe 9 and a pipe 10, respectively into the granulation chamber 1 and to the top of the electric furnace 7. Inner pressure of the granulation chamber 1 is controlled by a valve 11 and a ventilator 12, and inner pressure of the electric furnace 7 is controlled by a valve 13 and a ventilator 14. The molten metal fed through the nozzle 3 onto the dish-like rotating disk 4 is scattered in the form of fine droplets with the aid of centrifugal force of the dish-like rotating disk 4, and then solidified after cooled under reduced pressure. The thus produced solid particles are fed through the discharge pipe 6 to an automatic filter 15, where the particles are classified. Reference sign 16 represents a particle collector.

A process of bringing the molten metal from the hot molten state down to the cold solidified state is the key for formation of the metal particle of this invention.

The process is carried out under conditions exemplified below.

With the melting temperature of metal in the electric furnace 7 preset to 600° C. to 800° C., the molten metal kept at that temperature is fed through the nozzle 3 onto the dish-like rotating disk 4.

The dish-like rotating disk 4 is a dish-like disk having an inner diameter of 35 mm and a thickness of rotating plate of 5 mm, which is rotated at 80,000 to 100,000 rpm.

A vacuum chamber which can be evacuated down to $9 \times 10^{-2}$ Pa or around is employed here as the granulation chamber 1, and is evacuated, to which nitrogen gas conditioned at 15 to 50° C. is fed while concurrently ventilating the chamber, so as to adjust the pressure in the granulation chamber 1 to $1 \times 10^{-1}$ Pa or below.

Chemical composition of the intermetallic compound crystal in the metal particle of this invention is preferably represented by 99 to 60% by mass of Sn, 0.1 to 35% by mass of Cu, 6.5 to 0.1% by mass of Ni and 0.001 to 0.1% by mass of Ge, which is given in terms of proportion of numbers of atoms as Sn:Cu:Ni:Ge=(40 to 70):(30 to 50):(4 to 9.5):(0.01 to 0.001).

The intermetallic compound in the metal particle of this invention typically accounts for 20 to 60% by mass of the whole metal particle, wherein the percentage is more preferably 30 to 40% by mass.

The chemical composition and the percentage of the intermetallic compound may be satisfied by following the aforementioned conditions for manufacturing the metal particle.

The metal particle of this invention is preferably such that at least parts of the basal phase and the intermetallic compound form an endotaxial joint. As described previously, the endotaxial joint means that an intermetallic compound precipitates in a substance which is expected to become metal or alloy (in this invention, the basal phase that contains Sn and an Sn—Cu alloy), wherein the Sn—Cu alloy and the intermetallic compound join during the precipitation while attaining lattice matching, to thereby produce crystal grains. Formation of the endotaxial joint can solve the problem of brittleness of the intermetallic compound, can also suppress the mechanical strength from degrading due to changes in the crystal structure of Sn described later, and can also provide a joint material that further excels in heat resistance, joint strength and mechanical strength. The present inventors have confirmed that the joint area, formed by using the metal particle of this invention, can retain the endotaxial joint in the metal particle.

The endotaxial joint in the metal particle of this invention may be formed according to conditions for cooling and solidifying the molten metal from a molten state at high temperatures, in the process of forming the metal particle of this invention.

Sn has a tetragonal crystal structure within a temperature range from approximately 13° C. to approximately 160° C. (Sn with the tetragonal crystal structure will be referred to as β-Sn), which causes transition to a cubic crystal structure in a lower temperature region (Sn with the cubic crystal structure will be referred to as α-Sn). The β-Sn crystal structure also causes transition to a high temperature phase crystal called orthorhombic crystal structure in a temperature region above approximately 160° C. (Sn with the orthorhombic crystal structure will be referred to as γ-Sn). The phase transition between the tetragonal β-Sn and cubic α-Sn is known to be accompanied by a particularly large volumetric change.

The metal particle of this invention contains a high temperature phase crystal even at approximately 160° C. or below (at room temperature, for example). For example, if the joint material that contains the metal particle is heated during the joining process, so as to bring the joint material into a semi-molten state rather than in full molten state, to thereby create a state containing the endotaxial joint formed between the intermetallic compound and the basal phase, the joint structure will retain a state that contains the high temperature phase crystal even after cooled down into a temperature range of 160° C. or below. Such high temperature phase crystal is less likely to cause phase transition to the tetragonal low temperature β-Sn phase, even if the temperature is lowered down to a certain degree. Sn thus remained unchanged, without causing phase transition into the tetragonal β-Sn, will not cause phase transition into α-Sn, and therefore does not cause a large volumetric change in association with the phase transition into α-Sn under lowered temperature. Hence, even in a temperature range of 160° C. or below (at room temperature, for example), the joint material that contains Sn with the high temperature phase crystal is relieved from a large volumetric change due to temperature change, as compared with other joint material that contains Sn in its chemical composition (that is, Sn having no high temperature phase crystal intentionally contained therein, which is retainable even in a temperature range of 160° C. or below).

Electronic components employ various metals including Cu, Ag, Au, Ni and so forth, with which Sn can join in a reliable manner.

With the high temperature phase crystal contained therein over a wide temperature range (even at room temperature, for example), and with the tetragonal low temperature β-Sn phase suppressed from generating therein as possible, the metal particle of this invention is featured by its unlikeliness of causing a large volumetric change in association with phase transition from tetragonal β-Sn to cubic α-Sn under temperature change, and can join with various metals employed in electronic components. Hence, the metal particle is especially beneficial to joining of minute joint part.

The effect obtainable by suppressing changes in crystal structure of Sn may properly be demonstrated by the endotaxial joint in the metal particle.

The metal particle of this invention can be formed into a sheet or paste, bringing it into contact with an object to be joined, holding them at 160° C. to 180° C. for 3 minutes or longer, then by allowing the sheet or paste to melt at 235° C. to 265° C., and allowed to solidify. A good joint structure can thus be formed.

The sheet that contains, as a material, the metal particle of this invention is obtainable typically by compressing the metal particle between rollers, typically as described below. That is, the metal particle of this invention is fed between a pair of pressure rollers that rotate in opposing directions, and then compressed while being heated through the pressure rollers to approximately 100° C. to 150° C.

Furthermore, the metal particle of this invention (IMC particle), when combined for example with Cu particle, Ni alloy particle or hydrogenated Ti powder which is more conductive than Sn, will have improved electro-conductivity and will be suppressed from causing volumetric change over a relatively wide temperature range, making it possible to manufacture a composite joint material sheet integrated with ceramic or the like, and also to obtain a base which functions as a heat-dissipation joint material.

The metal particle of this invention may even yield a conductive paste, if dispersed in an organic vehicle.

The sheet or the conductive paste may be formed of a mixture of metal particle, by adding other particle such as SnAgCu-based alloy particle, Cu particle, Cu alloy particle, Ni particle, Ni alloy particle, or mixture of any of these particles. Such other particle may optionally be coated with a metal such as Si.

For example, by combining the metal particle with Cu particle or Ni alloy particle which is more conductive than Sn, obtainable is a metal joint layer which is highly conductive, and whose volumetric change is suppressed over a relatively wide temperature range.

EXAMPLES

This invention will further be explained below referring to Examples and Comparative Examples. This invention is, however, not limited to Examples below.

Example 1

Figure 2:
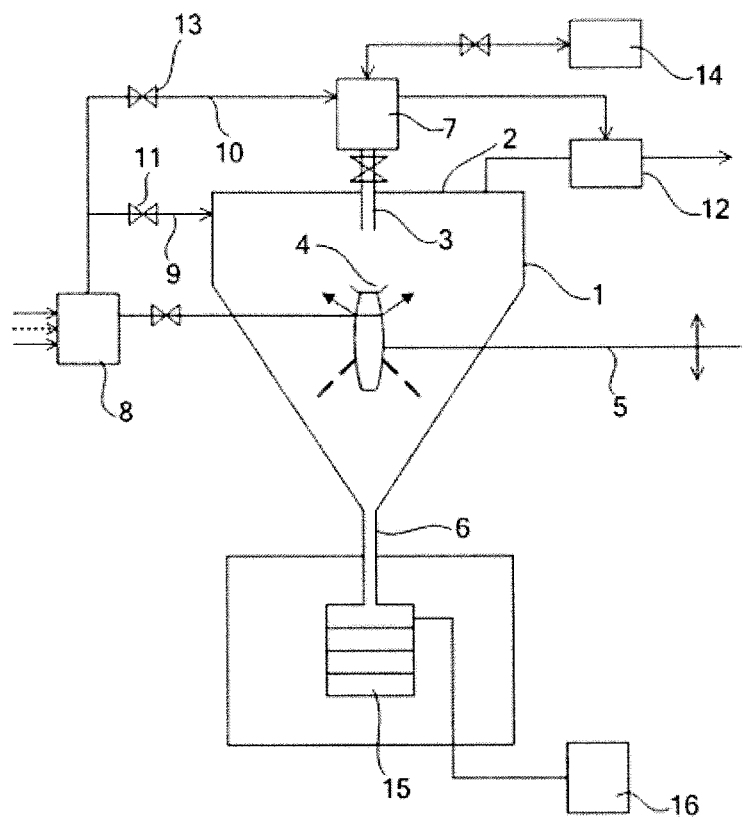
FIG. 2 is a schematic drawing illustrating an exemplary manufacturing apparatus suitably applicable to manufacture of the metal particle of this invention.

A metal particle having a diameter of approximately 3 to 13 μm was manufactured from a starting material composed of 8% by mass of Cu, 1% by mass of Ni, 0.001% by mass of Ge and the balance of Sn, with use of the manufacturing apparatus illustrated in FIG. 2.

Conditions below were employed for the process.

A melting crucible was placed in the electric furnace 7, into which the aforementioned starting material was placed and melted at 650° C., and while keeping the temperature, the molten metal was fed through the nozzle 3 onto the dish-like rotating disk 4.

The dish-like rotating disk 4 employed here was a dish-like disk with an inner diameter of 35 mm and a thickness of rotating plate of 5 to 3 mm, which was rotated at 80,000 to 100,000 rpm.

The granulation chamber 1 which can be evacuated down to around $9 \times 10^{-2}$ Pa was evacuated, to which nitrogen gas at 15 to 50° C. was fed and concurrently evacuated, to thereby adjust the inner pressure of the granulation chamber 1 to $1 \times 10^{-1}$ Pa or below.

The obtained metal particle 1 was found to have a cross section presented in FIG. 1. EDS element mapping on the cross section of the metal particle revealed that Cu accounts for 10.24% by mass, Ni accounts for 0.99% by mass, and Ge accounts for 0.001% by mass, with the balance of Sn.

The intermetallic compound in the metal particle 1 was found to account for 30 to 35% by mass of the metal particle.

Figure 3:
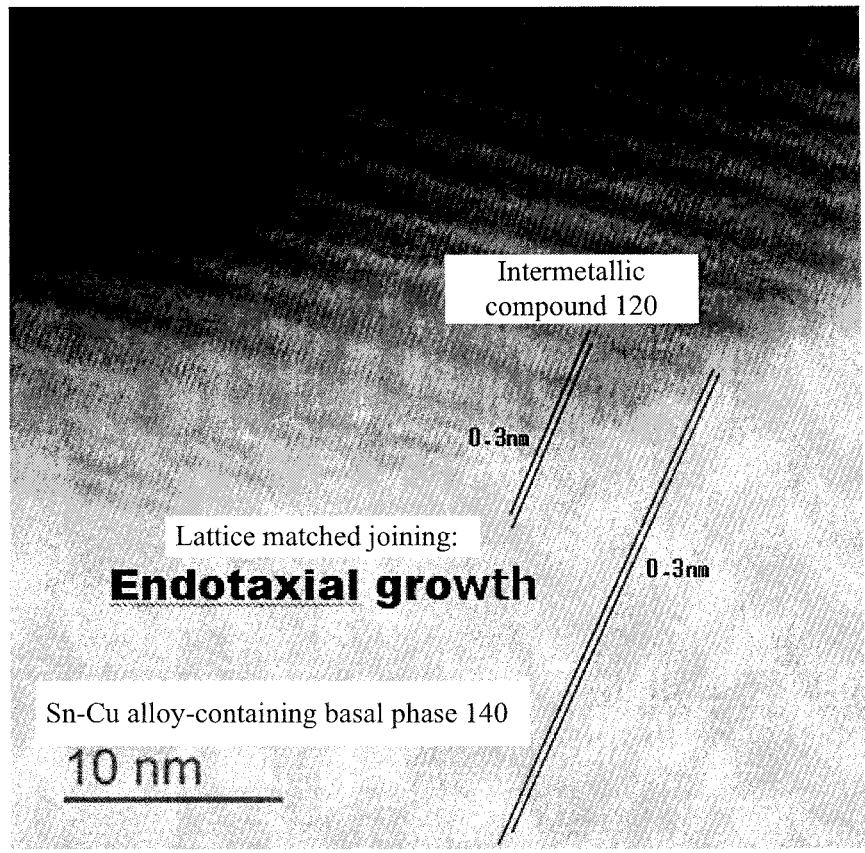
FIG. 3 presents a STEM image of a cross section of a metal particle obtained in Example 1, and a result of local analysis.
Figure 3:
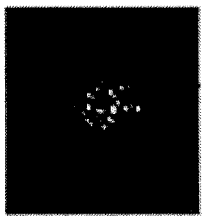

FIG. 3 presents a STEM image of the cross section of the metal particle obtained in Example 1, and a result of local analysis.

The upper image in FIG. 3 teaches that an intermetallic compound 120 that contains Sn, Cu, Ni and Ge resides in the basal phase 140 that contains Sn and an Sn—Cu alloy. Lattice constants (and crystal orientations) agree between the basal phase 140 and the intermetallic compound 120 (0.3 nm in FIG. 3), proving that the individual crystals are successively joined while attaining lattice matching. That is, the endotaxial joint was confirmed from the upper image in FIG. 3 indicating joining of the lattices, and also absence of a buffer layer between the crystals was confirmed from the lower image of FIG. 3 that presents a transmission electron diffraction pattern of the interface between the basal phase 140 and the intermetallic compound 120.

In the metal particle of this invention, area ratio of the endotaxial joint, when assuming the total area of joint face between the basal phase and the intermetallic compound as 100%, is preferably 30% or larger, and more preferably 60% or larger. The area ratio of the endotaxial joint may be calculated typically as follows.

A cross section of the metal particle, such as presented in FIG. 1, is photographed under an electron microscope, and joint faces between the intermetallic compound and the Sn—Cu alloy are sampled at 50 freely selected points. The joint faces are then examined by image analysis, to thereby determine to what degree the endotaxial joint, such as presented in FIG. 3, resides in the sampled joint faces.

It was also found from FIG. 3 that at least a part of Sn in the metal particle of this Example retains the high temperature phase crystal even at normal temperature.

Next, the metal particle 1 in a dry powder form was compressed to manufacture a sheet, the sheet was then used for joining a gold electrode and a copper substrate, and subjected to a high temperature storage test (HTS) at 260° C. Results indicated that shear strength elevated from approximately 50 MPa up to approximately 60 MPa, over a period ranging from the start of test until approximately 100 hours after, and remained plateau at approximately 60 MPa over a temporal range beyond 100 hours.

On the other hand, temperature cycle test (TCT) ranged from −40 to 200° C. yielded results indicating that the shear strength was stabilized at approximately 50 MPa over the whole cycles (1000 cycles).

Example 2

A metal particle 2 was manufactured in the same way as in Example 1, except by using a starting material composed of 8% by mass of Cu, 3% by mass of Ni, 0.1% by mass of Ge and the balance of Sn.

Next, 70% by mass of the metal particle 2, and 30% by mass of alloy powder composed of 90% by mass of Cu and 10% by mass of Ni were homogeneously mixed, and the mixture in a dry powder form was compressed to manufacture a sheet (50 μm thick). The sheet was then used for joining the copper substrate and the silicon device, and subjected to the high temperature storage test (HTS) at 260° C. Results indicated that shear strength elevated from approximately 60 MPa up to approximately 70 MPa, over a period ranging from the start of test until approximately 100 hours after, and remained plateau at approximately 60 MPa over a temporal range beyond 100 hours.

On the other hand, temperature cycle test (TCT) ranged from −40 to 200° C. yielded results indicating that the shear strength was stabilized at approximately 50 MPa over the whole cycles (1000 cycles).

Comparative Example 1

As a comparative example, a prior SnAgCu-based joint material (powdery solder material with a particle size of 5 μm) was used as the joint material. The temperature cycle test (TCT) carried out in the same way as in Example 1 (−40 to 200° C.) revealed that the joint area caused decay before going through 100 cycles, which was far from achieving heat resistance and strength comparable to those of the metal particle of this invention.

The present inventors confirmed from our investigations that the prior SnAgCu-based joint material did not contain the intermetallic compound, instead allowing a single metal element to be dispersed therein. The present inventors also confirmed that the Sn—Cu alloy of the basal phase did not have a crystal structure of the high temperature phase.

Figure 4:
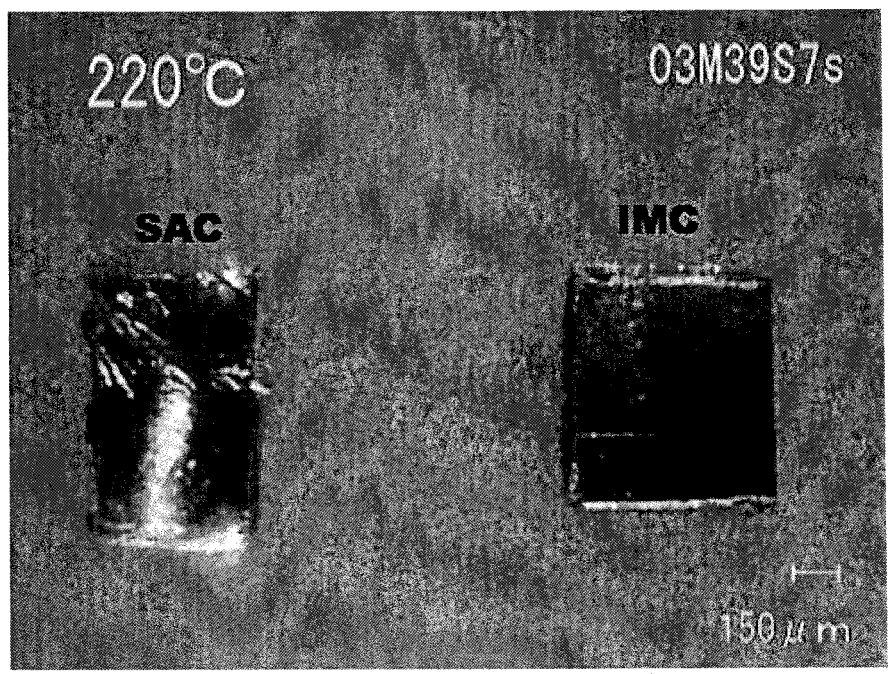
FIG. 4 is an optical microphotograph of the surfaces of gold electrodes, observed after a sheet of a metal particle 1 (IMC) obtained in Example 1 and a sheet of an SnAgCu-based joint material (SAC) of Comparative Example 1 were manufactured by dry powder compression, each sheet was used for joining between the gold electrode and a copper substrate, followed by heating at 220° C.

FIG. 4 is an optical microphotograph of the surfaces of gold electrodes, observed after a sheet of a metal particle 1 (IMC) obtained in Example 1 and a sheet of an SnAgCu-based joint material (SAC) of Comparative Example 1 were manufactured by dry powder compression, each sheet was used for joining between the gold electrode and the copper substrate, followed by heating at 220° C.

Figure 5:
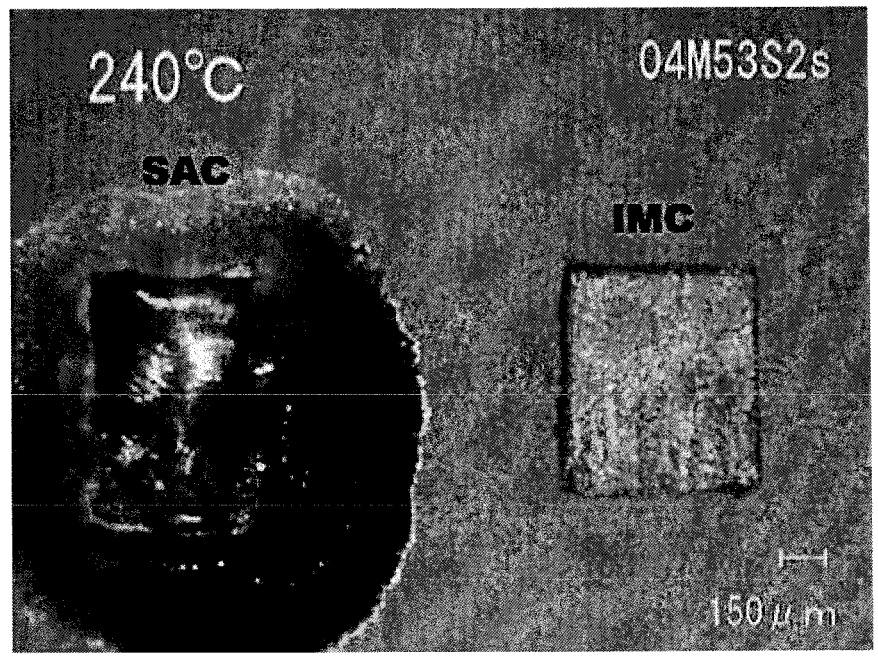
FIG. 5 is an optical microphotograph of the surfaces of gold electrodes, observed after a sheet of a metal particle 1 (IMC) obtained in Example 1 and a sheet of an SnAgCu-based joint material (SAC) of Comparative Example 1 were manufactured by dry powder compression, each sheet was used for joining between the gold electrode and a copper substrate, followed by heating at 240° C.

FIG. 5 is an optical microphotograph of the surfaces of gold electrodes, observed after a sheet of a metal particle 1 (IMC) obtained in Example 1 and a sheet of an SnAgCu-based joint material (SAC) of Comparative Example 1 were manufactured by dry powder compression, each sheet was used for joining between the gold electrode and the copper substrate, followed by heating at 240° C.

Results illustrated in FIGS. 4 and 5 showed no particular change on the surface of the gold electrode for both cases of IMC and SAC at a heating temperature of 220° C., whereas intense Sn diffusion was observed over the surface of the gold electrode for the case of SAC at a heating temperature of 240° C. IMC in FIG. 5 showed no particular change.

Figure 6:
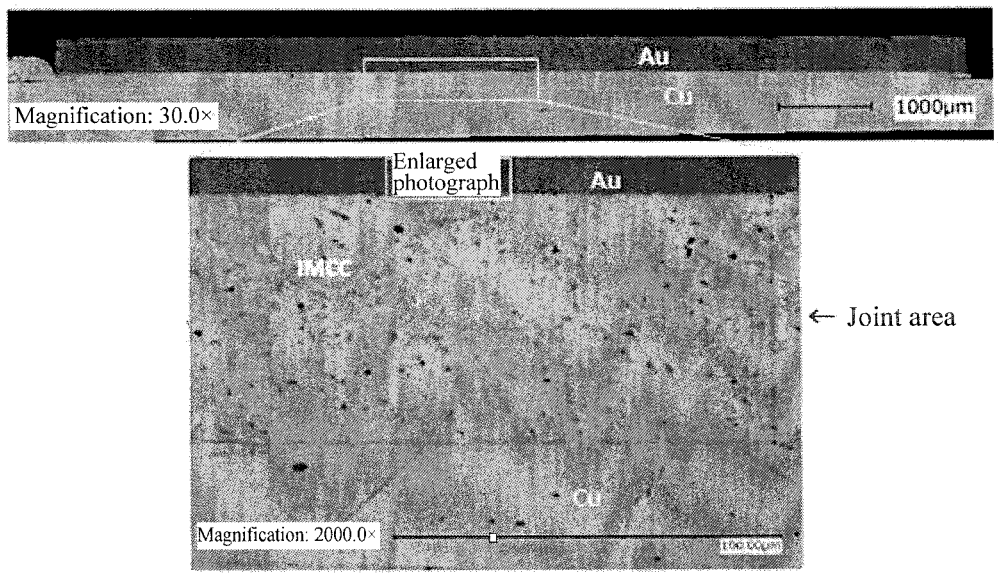
FIG. 6 presents optical microphotographs of the cross section of the joint area between the gold electrode and the copper substrate obtained in Example 1, observed after a thermal shock test.

FIG. 6 presents optical microphotographs of the cross section of the joint area between the gold electrode and the copper substrate obtained in Example 1, observed after a thermal shock test.

The thermal shock test was conducted 50 cycles at a lower exposure temperature of −40° C. and a higher exposure temperature of 175° C.

FIG. 6 confirms that the joint area between the gold electrode and the copper substrate was properly retained without causing decay.

Figure 7:
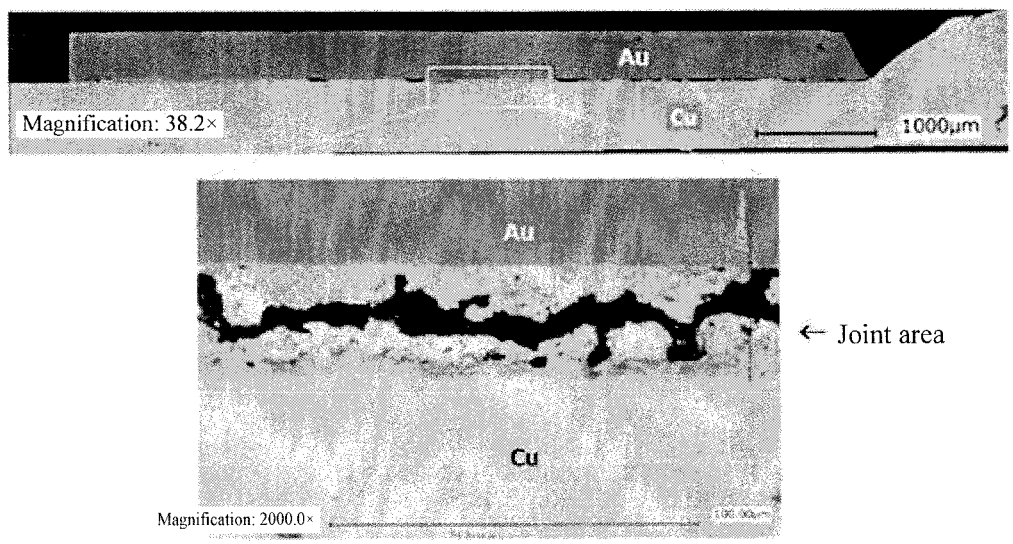
FIG. 7 presents optical microphotographs of the cross section of the joint area between the gold electrode and the copper substrate obtained in Comparative Example 1, observed after a thermal shock test.

FIG. 7 presents optical microphotographs of the cross section of the joint area between the gold electrode and the copper substrate obtained in Comparative Example 1, observed after a thermal shock test.

The thermal shock test was conducted 50 cycles at a lower exposure temperature of −40° C. and a higher exposure temperature of 175° C.

FIG. 7 confirms that the joint area between the gold electrode and the copper substrate decayed even as early as the 50th cycle after the start of the thermal shock test.

Figure 8:
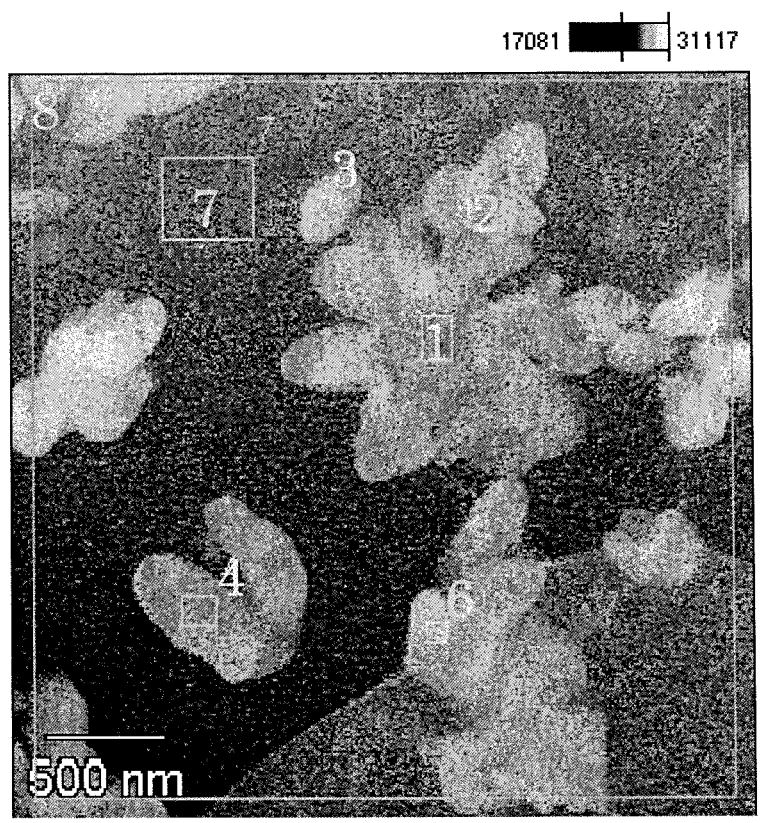
FIG. 8 presents a part of the photograph of the metal particle presented in FIG. 1 with numbering of points analyzed by AES.

FIG. 8 presents a part of the photograph of the metal particle presented in FIG. 1 with numbering of points analyzed by AES. A part surrounded by a rectangular frame in FIG. 1 is enlarged in FIG. 8. AES analysis was conducted at the points numbered in FIG. 8.

FIG. 9 is a chart summarizing results of the analysis by ICP-AES. Note that IMC in FIG. 9 represents an intermetallic compound crystal that contains Sn, Cu, Ni and Ge.

Having detailed this invention referring to the attached drawings, this invention is not limited to these Examples. It is apparent that those skilled in the art will easily arrive at various modifications, on the basis of basic technical spirit and teaching of this invention.

What is claimed is:

1. A metal particle for joint material, comprising an intermetallic compound crystal that contains Sn, Cu, Ni and Ge, in a basal phase that contains Sn and an Sn—Cu alloy,
   the metal particle consisting of Sn, Cu, Ni, Ge and inevitable impurity and having a chemical composition represented by 0.7 to 15% by mass of Cu, 0.1 to 5% by mass of Ni, 0.001 to 0.1% by mass of Ge and the balance of Sn,
   the basal phase having a chemical composition represented by 95 to 99.9% by mass of Sn, 5% by mass or less of Cu and 0.1% by mass or less of an inevitable impurity,
   the intermetallic compound crystal residing in the basal phase so as to be included therein,
   the metal particle having a particle size of 1 μm to 50 μm,
   the metal particle containing an orthorhombic crystal structure, and
   at least parts of the basal phase and the intermetallic compound crystal forming an endotaxial joint.

2. The metal particle for joint material according to claim 1, wherein the intermetallic compound crystal has a chemical composition represented by 99 to 60% by mass of Sn, 0.1 to 35% by mass of Cu, 6.5 to 0.1% by mass of Ni and 0.001 to 0.1% by mass of Ge.

3. The metal particle for joint material according to claim 1, wherein the intermetallic compound crystal constitutes 20 to 60% by mass of the metal particle.

4. A metal particle for joint material, comprising an intermetallic compound crystal that contains Sn, Cu, Ni and Ge, in a basal phase that contains Sn and an Sn—Cu alloy,
   the metal particle consisting of Sn, Cu, Ni, Ge and inevitable impurity and having a chemical composition represented by 0.7 to 15% by mass of Cu, 0.1 to 5% by mass of Ni, 0.001 to 0.1% by mass of Ge and the balance of Sn, the basal phase having a chemical composition represented by 95 to 99.9% by mass of Sn, 5% by mass or less of Cu and 0.1% by mass or less of an inevitable impurity,
   the intermetallic compound crystal residing in the basal phase so as to be included therein,
   the metal particle having a particle size of 1 μm to 50 μm,
   the metal particle being formed by melting the Sn, Cu, Ni and Ge at 600° C. to 800° C., and feeding the molten material through a nozzle onto a disk rotated at high speed under a nitrogen atmosphere and reduced pressure so that droplets of the molten material cool and solidify and so that the metal particle contains an orthorhombic crystal structure, and
   at least parts of the basal phase and the intermetallic compound crystal forming an endotaxial joint.

5. The metal particle for joint material according to claim 4, wherein when the metal particle is being formed the disk is rotated at 80,000 to 100,000 rpm, and the nitrogen atmosphere is at a temperature of 15 to 50° C. and a pressure of 1 to $1 \times 10^{-1}$ Pa or below.

6. The metal particle for joint material according to claim 4, wherein the intermetallic compound crystal has a chemical composition represented by 99 to 60% by mass of Sn, 0.1 to 35% by mass of Cu, 6.5 to 0.1% by mass of Ni and 0.001 to 0.1% by mass of Ge.

7. The metal particle for joint material according to claim 4, wherein the intermetallic compound crystal constitutes 20 to 60% by mass of the metal particle.

\* \* \* \* \*